United States Patent
Beck et al.

(10) Patent No.: US 7,227,567 B1
(45) Date of Patent: Jun. 5, 2007

(54) CUSTOMIZABLE BACKGROUND FOR VIDEO COMMUNICATIONS

(75) Inventors: Alexander John Gray Beck, French's Forest (AU); Colin Blair, Westleigh (AU); Andrew W. Lang, Sydney (AU); Paul Thomas McNamara, Killarney Heights (AU); David Preshan Thambiratnam, Ashfield (AU); James K. Wan, Carlingford (AU)

(73) Assignee: Avaya Technology Corp., Basking Ridge, NJ (US)

( * ) Notice: Subject to any disclaimer, the term of this patent is extended or adjusted under 35 U.S.C. 154(b) by 157 days.

(21) Appl. No.: 10/941,199

(22) Filed: Sep. 14, 2004

(51) Int. Cl.
*H04N 7/14* (2006.01)

(52) U.S. Cl. .............................. 348/14.07; 348/14.01; 348/14.08

(58) Field of Classification Search .. 348/14.01–14.09, 348/14.1, 14.11, 14.12, 14.13, 14.16; 382/100, 382/154
See application file for complete search history.

(56) References Cited

U.S. PATENT DOCUMENTS

| | | | |
|---|---|---|---|
| 4,791,660 A | 12/1988 | Oye et al. ...................... 379/88 |
| 5,164,992 A | 11/1992 | Turk et al. ...................... 382/2 |
| 5,506,872 A | 4/1996 | Mohler ........................ 375/240 |
| 5,675,376 A | 10/1997 | Andersson et al. ............ 348/20 |
| RE36,041 E | 1/1999 | Turk et al. ................... 382/118 |
| 5,986,703 A | 11/1999 | O'Mahony .................. 348/333 |
| 6,507,356 B1 | 1/2003 | Jackel et al. .............. 348/14.06 |
| 6,593,955 B1* | 7/2003 | Falcon ..................... 348/14.01 |
| 6,753,900 B2 | 6/2004 | Runcie et al. ........... 348/14.16 |
| 2002/0061131 A1 | 5/2002 | Sawhney et al. ............ 382/154 |
| 2002/0113862 A1 | 8/2002 | Center, Jr. et al. ....... 348/14.08 |
| 2004/0012613 A1* | 1/2004 | Rast ........................... 345/632 |

FOREIGN PATENT DOCUMENTS

| | | |
|---|---|---|
| EP | 0 118 182 | 9/1985 |
| JP | 401221086 A | 9/1989 |
| JP | 404344788 A | 12/1992 |

OTHER PUBLICATIONS

Myers; Videophone with enhanced user defined imaging system; WO 99/57900.*
Cisco Systems, Inc., "Cisco VT Advantage Video Telephony Solution," (1992-2004), pp. 1-6.
CDM Optics, "Image Gallery," (2001).
U.S. Appl. No. 10/459,182, filed Jun. 10, 2003, Chan et al.
U.S. Appl. No. 10/949,781, filed Sep. 24, 2004, Lang et al.
Digibird.com, "Essential Optics for Digiscoping," (2002), available at http://www.digibird.com/primerdir/primer0.htm, 4 pages.

(Continued)

*Primary Examiner*—Melur Ramakrishnaiah
(74) *Attorney, Agent, or Firm*—Sheridan Ross P.C.

(57) ABSTRACT

A video telecommunications system 100 for effecting a communication between at least first and second participants including
an image alteration agent 358 that (i) removes desired and/or undesired image information 370 and 374 from the acquired image information 362 to form filtered image information 378 and the removed information and (ii) combines the filtered image information 378 and/or the image information 370 and 374 with substitute image information 382 to form composite image information 366; and
a video communication infrastructure 304 that transmits the composite image information 366 to a communication device associated with the second participant 120. The composite image information 366 excludes undesired image information 374.

25 Claims, 8 Drawing Sheets

OTHER PUBLICATIONS

Fintzel et al., "Real Time 3D Navigation in a Static Virtualized Scene from a Limited Set of 2D Data," IEEE Int'l Conf. on Multimedia & Expo 2000, New York, Electronic Proceedings, 11 pages.

The Imaging Source website, "Introduction to Optics and Lenses," (2003), available at http://www.theimagingsource.com/prod/opt/opticsintro_2.htm, 10 pages.

Mark et al., "Post-Rendering 3D Warping", In Proceedings of 1997 Symposium on Interactive 3D Graphics, Providence, RI, Apr. 27-30, 1997, pp. 7-16.

Marpe et al., "Video Compression Using Context-Based Adaptive Arithmetic Coding," Proc. IEEE International Conference on Image Processing (ICIP'01), vol. III, pp. 558-561, Oct. 2001.

Nikon MicroscopyU: Interactive Java Tutorials website, "Digital Camera Resolution Requirement for Optical Microscopy," (2000-2004), available at http://www.microscopyu.com/tutorials/java/digitalimaging/pixelcalculator, 4 pages.

"Nordic Guide to Video Telephony and Video Relay Service," The Nordic Forum for Telecommunication and Disability 2002, NFTH Mar. 2002, pp. 1-14.

Oshima, Shigeru, "Acquisition: Fundamental Optics of Television Camera Lenses," shortened version of the Fundamental Optics section in Canon Guidebook of Television System Optics ($2^{nd}$ Ed.), (Jan. 2000), 13 pages.

Soongsathitanon, Somphob, et al., University of Newcastle upon Tyne, "A New Orthogonal Logarithmic Search Algorithm for Fixed Block-Based Motion Estimation for Video Coding," date unknown, 4 pages.

Techno World, "Multimedia Cameras for Visual Society: Ultraminiature Multimedia Camera Systems," (undated), 6 pages.

Wolberg, George, "Digital Image Warping," IEEE Computer Society Press Monograph (Mar. 4, 2002), available at http://www-cs.ccny.cuny.edu/~wolberg.diw.html, 7 pages.

Brandstein, Michael, "Real-Time Face Tracking Using Audio and Image Data," Harvard Intelligent Multi-Media Environment Laboratory (HIMMEL) (undated), pp. 1-22.

Eisert, Peter, "Immersive 3-D Video Conferencing: Challenges, Concepts, and Implementations," Proc. SPIE Visual Communications and Image Processing (VCIP), Lagano, Switzerland (Jul. 2003), 11 pages.

Imagis Technologies Inc. News Release, "Imagis Technologies Release Major Upgrade to Face Recognition Software," (Sep. 2002).

Entropy Software Laboratory, "Image Recognition" (undated), available at http://www.entropysoftwarelab.com/technology/imageRecognition.html, 3 pages.

Sanyo Electric Co., Ltd., "Character and Image Recognition Technology," Technology R&D Headquarters (2003), available at http://www.sanyo.co.jp/R_and_D/english/theme/c-2.html, 2 pages.

Toshiba Corporation Press Release, "Toshiba Announces World's First Image Recognition LSI for Intelligent Vehicle System," (Feb. 6, 2001), available at http://www.toshiba.co.jp/about/press/2001_02/pr0602.htm, 3 pages.

Jun, Song F. et al., *Optical Feature Recognition*, (Mar. 6, 1995), 1 page.

Peter Kauff Projects, "BS-Immersive Media & 3D Video Group," (Ed. Christoph Fehn, Nov. 12, 2002), 6 pages.

* cited by examiner

CUSTOMIZABLE BACKGROUND FOR VIDEO COMMUNICATIONS

CROSS REFERENCE TO RELATED APPLICATION

Cross reference is made to U.S. patent application Ser. No. 10/949,781, filed Sep. 24, 2004, entitled "CAMERA FRAME DISPLAY", which is incorporated herein by this reference.

FIELD OF THE INVENTION

The invention relates generally to an image acquisition system and particularly to an image acquisition that is user customizable to provide a selected video display to another participant to a video telecommunication.

BACKGROUND OF THE INVENTION

The use of video telephony, which allows remote parties to both see and hear one another, is becoming increasingly popular. As used herein, "video telephony" refers to visual communication using both video and audio transmitted over a communications network. It includes both mobile and stationary video telephony. Typically, video telephony refers to packet-switched and circuit-switched, wireless and wired, audio and video communications, such as Voice Over IP or VOIP communications, and video teleconferencing. Such applications facilitate remote communication by providing a visual image of each conference participant. Accordingly, video conferencing allows parties to communicate audibly and visibly, without requiring lengthy and expensive travel.

In a typical video telecommunications application, a camera is positioned to obtain an image of each of the participants. The image of one participant is then provided to the other participant so that each participant is viewing the other participant during the communication session. The video telecommunications interaction can include two or more participants, each viewing an image of the other participant(s).

When conducting a video conference or point-to-point video call, a participant may desire to control the video displayed to the other participants for privacy and other reasons. For example, the participant may not want his or her face to be clearly viewable to one or more of the other participants. They may want to blur or mask the image of their face in the transmitted image information. The participant may want to block, from the transmitted image information, the images of objects, other than himself or herself, that are in the field of view of the camera(s). For example, the participant may wish to block office clutter or disarray, another person, or otherwise reconfigure his or her background to make it appear that the person is somewhere that he or she is not.

There are a variety of features in current video telecommunications applications for addressing some, but not all, of these issues. For example, a sending participant may mute the transmission of his or her image information so that the other party's video monitor is a blank screen. The party will receive an indication that the sending participant has muted his or her image information. While muting does provide a degree of privacy, it can be overkill. In many situations, the sending participant may be happy to allow himself or herself to be seen on the other participant's video monitor but wish for other features in the image information to be altered. Moreover, completely muting the image information may offend or otherwise upset the other party. He or she may retaliate by muting their image information so that the video telecommunication is converted effectively into an audio-only communication, thereby defeating the party's desires to have additional communication effected through visual gestures and facial expressions.

The receiver may also want to alter the image information received from the other participant. For example, the receiving participant may find the other party's background distracting. In addition to muting completely the other party's image information, the receiving party may use immersive video, which is described in "*Immersive* 3-*D Video Conferencing: Challenges, Concepts, and Implementations*" by Eisert. In immersive video, the background in the received image information is altered so that it appears to be the same background as the receiving party's background. For example, the receiving party is seated at a large conference table and the received image information is altered to make it appear that the other participant(s) are also seated at the conference table. While this approach is attractive in certain applications, it fails to provide the receiver with freedom to alter the background as he or she wishes. It would be desirable for the receiving party to simply remove the background and replace it with a selected color, such as white.

SUMMARY OF THE INVENTION

These and other needs are addressed by the various embodiments and configurations of the present invention. The present invention generally relates to a sender's reconfiguration of image information in a video telecommunications session or interaction prior to transmission of the information to the other party.

In one embodiment of the present invention, a method for performing a video telecommunications interaction between at least first and second participants is provided. The method includes the steps of:

(a) acquiring image information, the image information including an image of the first participant;

(b) removing the desired or undesired image information from the acquired image information to form filtered image information and the removed desired and/or undesired image information;

(c) combining the filtered image information with substitute image information to form composite image information; and (d) transmitting the composite image information to a communication device associated with the second participant. The composite image information excludes the undesired image information.

The present invention permits the first participant to select one or more objects in the acquired image information to be removed and replaced by other objects in the existing image background information and/or other image information (collectively "substitute image information"). For example, all or a portion of the actual background image information or specific objects in the background image information can be removed from the acquired image information and replaced with substitute background image information to make the first participant appear to be in a different location and/or to conceal existing objects in the actual background image information. In a further example, the first participant can select his or her face and/or clothing or feature thereof and replace them with an altered or different face, clothing, or feature thereof.

Image recognition technology can be employed to permit the first participant to select morphological shapes, such as a human head or body, which are identified and distinguished from other objects in the same image. This permits either desired or undesired objects to be extracted from the acquired image information. In the former case, the desired object or image information can be combined with substitute image information. In the latter case, the remaining image information is assumed to be the desired image information and can be combined with the substitute image information.

The first participant can control freely which part of the image information acquired by his or her video telecommunications system will be provided to the other participant. The present invention can be used not just for removing the actual background image information and replacing it with desired background image information. Any morphological object may be removed or altered. For example, the first participant may desire to alter or blur his or her face to prevent the second participant from accurately identifying him or her. In this manner, complete muting of image information by a participant is no longer required to realize a desired degree of privacy or to hide imaged objects from the other participant.

The same algorithm may be employed on the receiving end or by the communication device of the second participant to permit the second participant to further alter the image information received from the first participant. The second participant can alter one or more objects in the image information as he or she desires. For example, he or she can alter the face of the first participant, the clothing of the first participant, objects in the background of the first participant, or the background itself. The second participant is not limited to substituting his or her background for the background in the received image information.

In one configuration, the background image information may be omitted from the transmitted image information and the substitute image information added by the receiver or second participant's communication device. For example, the receiving party's communication device can receive just the first participant's image and overlay it on a desired background, such as a selected color. In one configuration, the background is transmitted once with the initial image information (which includes the desired and substitute image information) and thereafter only the desired image information from the currently acquired image information is provided to the second participant's communication device by the first participant's video telecommunications system. The second participant's communication device combines the substitute image information with the desired image information as it is received. This can effect a substantial bandwidth savings.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
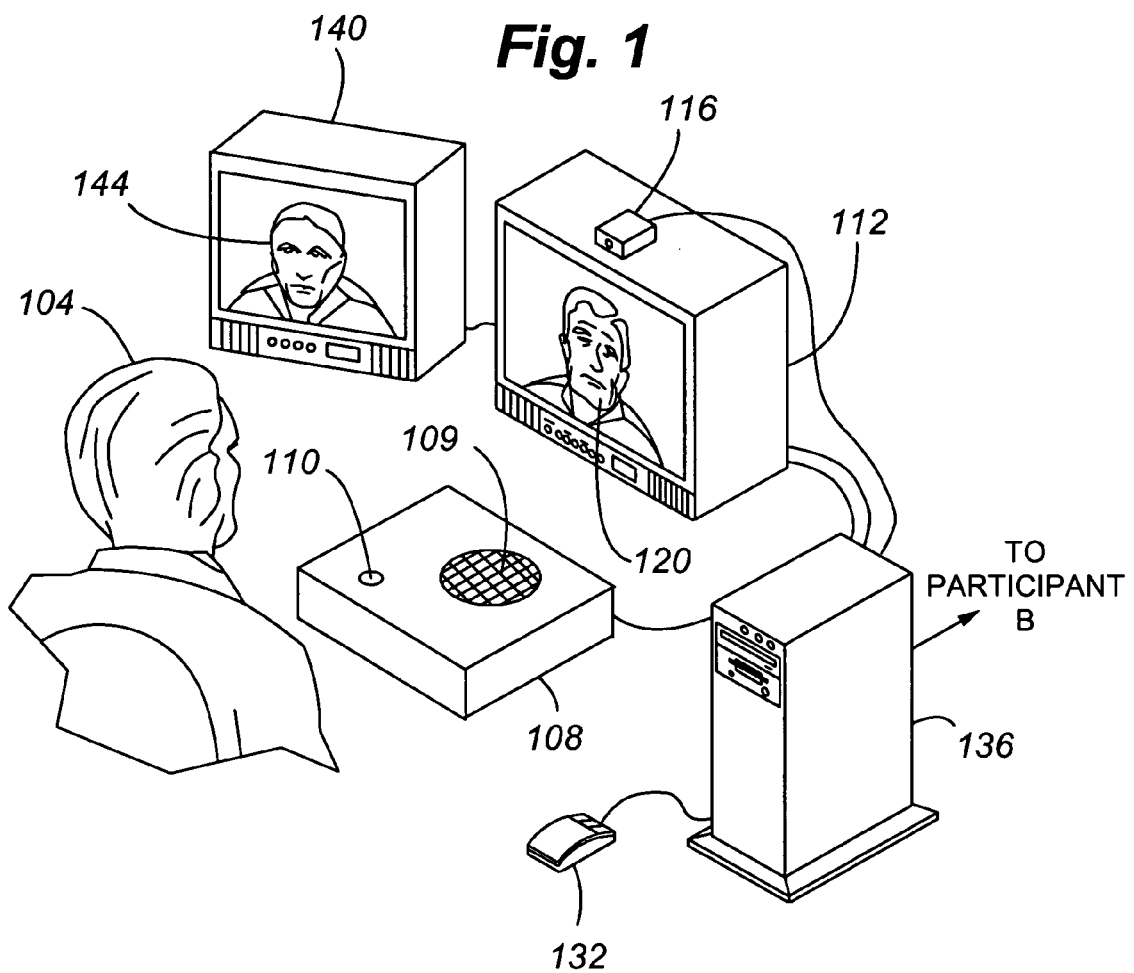
FIG. 1 depicts a video telecommunications system according to an embodiment of the present invention.

With reference to FIG. 1, components of a video telecommunications system 100 in accordance with an embodiment of the present invention are illustrated. In general, the video telecommunications system 100 comprises a first participant 104, an audio transceiver 108, which includes a speaker 109 and a microphone 110, first and second video displays 112 and 140, and a camera 116. The video telecommunications system 100 allows the first participant 104 to communicate both audibly and visibly with a second participant at a remote location. In FIG. 1, an image 120 of the second participant is shown in the display 112 and the image 144 of the first participant 104 is shown in the display 140.

The camera 116 acquires the image information of the first participant 104. In one configuration, the camera is connected to a Universal Serial Bus (USB) of the Personal Computer or PC 136 running the Microsoft Windows 2000™ operating system. Standard Windows Driver Model methods are used to bring individual frames of the video sequence into a storage area in Random Access Memory or RAM. The camera driver is configured to deliver the image in YUV format. In YUV format, each pixel of the image information is represented by three 8-bit numbers called channels. The color information is contained in the U and V channels and the intensity (black and white) information is contained in the Y channel.

In general, the video telecommunications system 100 of the present invention provides a user selection input device 132 associated with the PC 136 for receiving input from the first participant to customize the images displayed in the first and second monitors or customizing the image information sent to and the image information received from the second participant. For example, as will be explained in greater detail below, the first participant 104 can select a desired background in which his image is to be displayed on the second monitor 140 and on the second participant's monitor (now shown) and a desired background in which the image of the second participant is to be displayed on the first monitor 112. As discussed in detail below, the desired objects to be included and/or excluded in the first participant's image information and to be included and/or excluded in the second participant's image information can be selected by the user selection input device 132. The object may be pointed to with a mouse cursor and the mouse clicked to identify the object. The mouse may be clicked and, while clicked, the mouse cursor dragged along the outline of the object. As will be appreciated, other image identification techniques may be employed depending on the type of input device 132 employed. The device 132 is not limited to a mouse but can be any type of input device, such as a stylus, a finger with a touch screen, a keypad, a track ball, a voice recognition system operating in connection with the microphone 110, and the like.

Figure 2A:
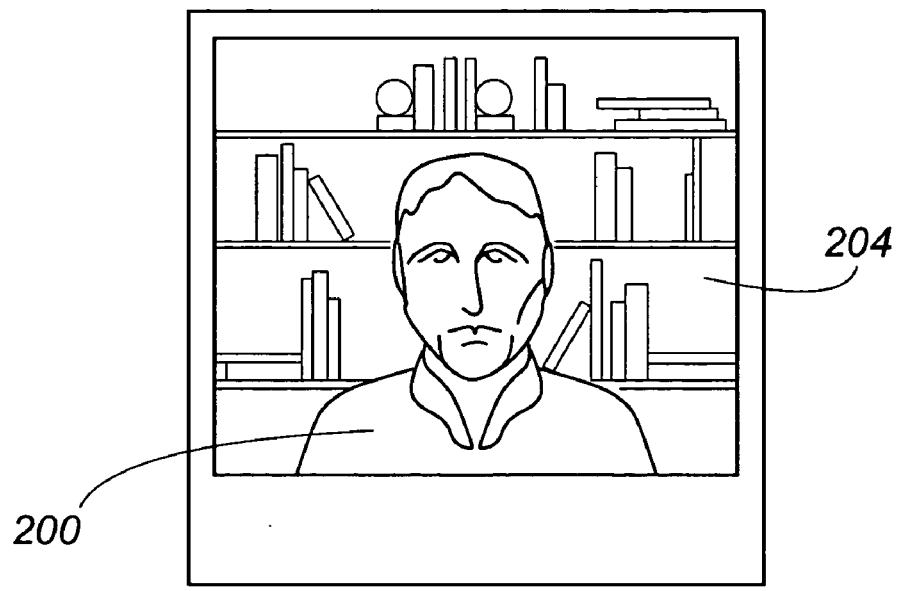
FIGS. 2A and 2B depict image information before and after alteration by a video telephony processing system of the present invention.
Figure 2B:
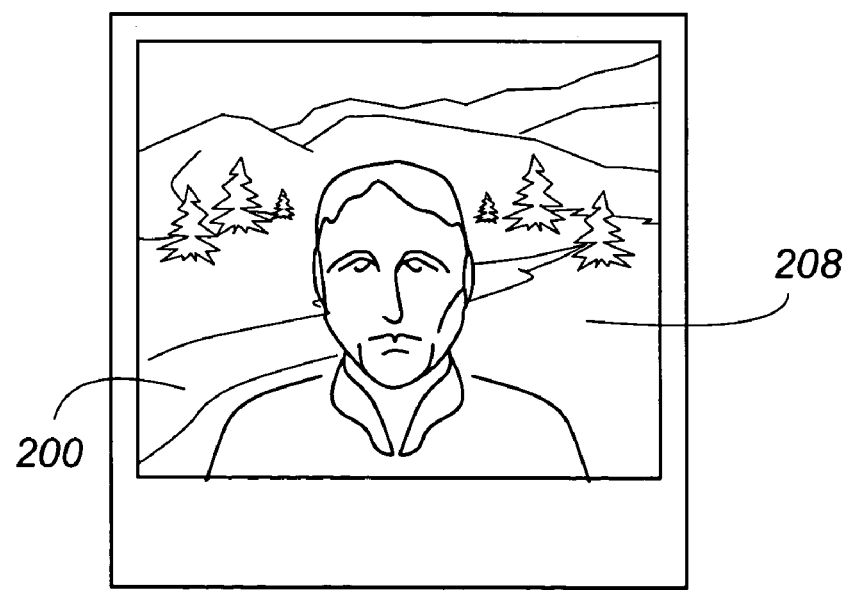

FIGS. 2A and 2B depict the image information received from the camera(s) (or acquired image information) before and after the acquired image information has been processed by the video telecommunications system 100. FIG. 2A shows the actual image 200 and background 204 of the first participant. The background 204 includes a disorganized bookcase that the first participant 104 seeks to remove from the view of the second participant. FIG. 2B shows the actual image of the first participant 104 with a new background 208. The new background 208 does not include the disordered bookcase of the actual background 204 but rather a more scenic background of a stream flanked by mountains and evergreens. The new background may have been a photograph taken by the first participant during a recent outing. The image information of FIG. 2B is what is encoded and transmitted to the second participant.

Figure 3A:
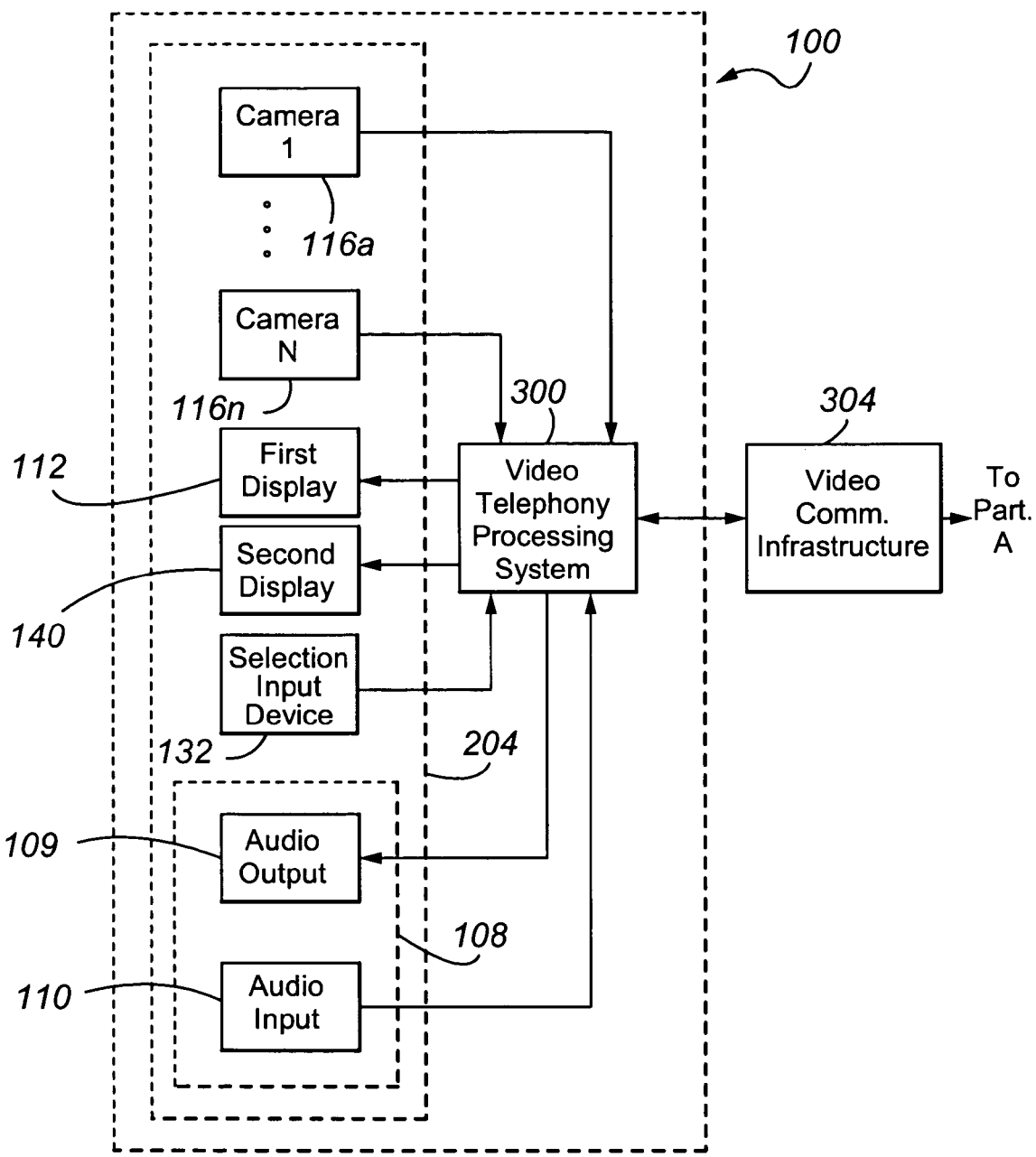
FIG. 3A is a block diagram depicting a video telecommunications system according to an embodiment of the present invention.

With reference now to FIG. 3A, a video telecommunications system 100 in accordance with an embodiment of the present invention is depicted in block diagram form. As noted above, the video telecommunications system 100 generally functions in connection with at least first and second participants. As shown in FIG. 3A, a video telecommunications system 100 in accordance with the present invention generally includes an audio transceiver 108, and the included speaker 109 and microphone 110, first and second displays 112 and 140, first through nth cameras 116*a–n*, the user selection input device 132, and the PC 136 including a video telephony processing system 300. In general, the devices for interfacing with the first participant 104, such as the audio transceiver 108, the first and second displays 112 and 140, the camera(s) 116*a–n*, and the user selection input device 132 are located in the proximity of the first participant (i.e. or at a first video location as shown in FIG. 1). As shown in FIG. 3A, the first video location is not limited to a single camera but may include additional cameras, such as cameras 116*a–n*, to produce desired visual effects, such as a 3D image. In one configuration, a wide angle center camera is used to cover the entire field of view of the system and to permit the location of each face in the field of view. Left and right cameras, positioned on either side of the center camera and having narrower fields of view provide higher quality images of objects further from the system. The first video location may additionally include the PC 136. Alternatively, the PC 136 may be sited at a different location. Furthermore, functions of the PC 136 may be distributed among various locations interconnected to the video telecommunications image acquisition system 100.

Figure 3B:
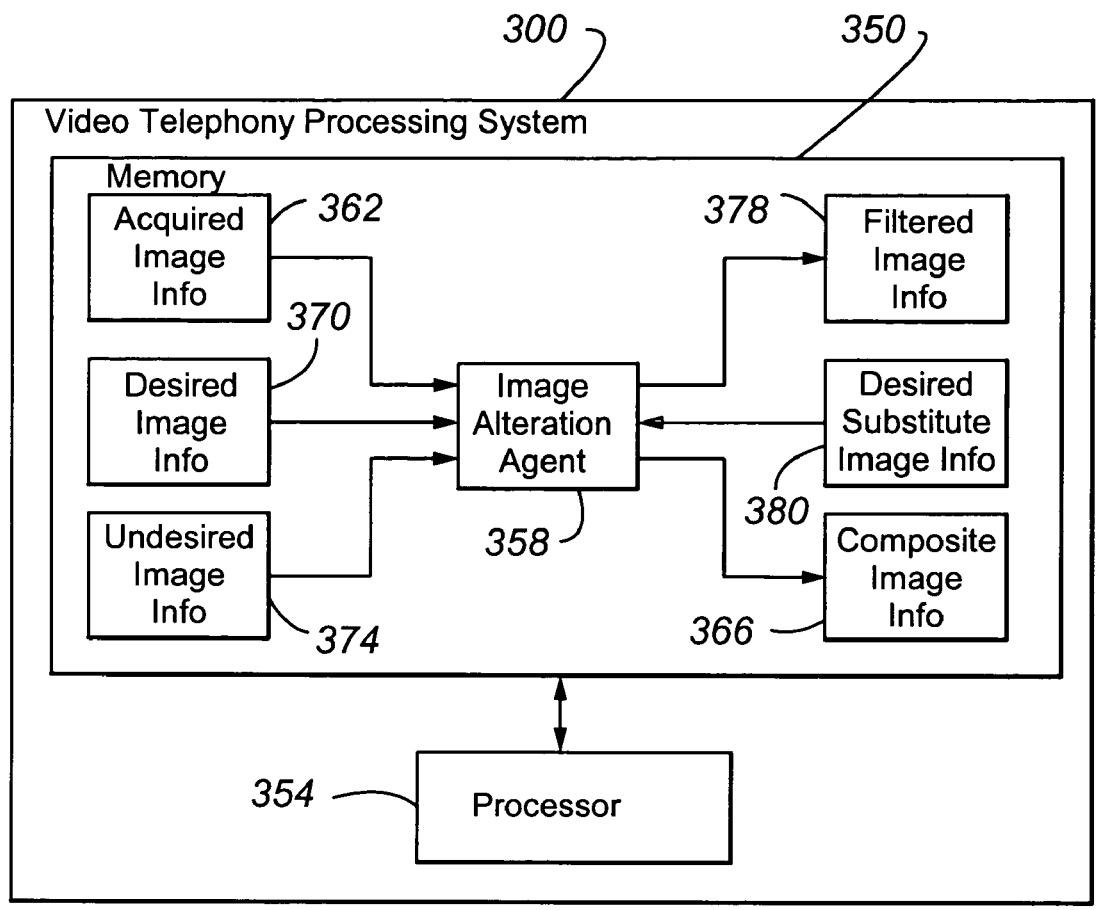
FIG. 3B is a block diagram depicting a video telephony processing system according to an embodiment of the present invention.

Referring now to FIG. 3B, the video telephony processing system 300 is depicted in greater detail as a software-controlled system (though the system may be implemented in firmware, such as by a logic circuit, e.g., an Application Specific Integrated Circuit or ASIC). The system 300 includes a memory 350 and processor 354. In the memory 350, an image alteration agent 358, based on user input, modifies or reconfigures the acquired image information 362 (which is the image information received from the camera (s)) to composite image information 366 which is encoded and transmitted to the second participant's video communication system (not shown). In processing the acquired image information 362 to form composite image information 366, certain additional data structures are used or created. One or both of the desired image information 370 and undesired image information 374 are received from the first participant. As will be appreciated, the first participant may specify before the video communication is placed or received, what information in the field of view of the camera(s) 116*a–n* is to be included (or the desired image information 370) and/or excluded (or the undesired image information 374). Typically, only one of the two types of information is received directly from the first participant. The filtered image information 378 is generated from the desired image information 370 and/or undesired image information 374 and typically includes the precise image information to be retained in the composite image information 366. The desired substitute image information 382 is the desired image information selected or configured by the first participant to be substituted for the selected image information removed from the acquired image information and missing from the filtered image information. When a new background is used, the desired substitute image information can be obtained from a digital image, either received from the first participant or previously provided as part of the video telephony processing system.

Returning again to FIG. 3A, the audio transceiver 108 provides audio output through a speaker 109 and audio input through a microphone 110. In accordance with an embodiment of the present invention, the audio transceiver 108 comprises a speaker phone having common telephony functionality. According to another embodiment of the present invention, the audio transceiver 108 comprises a speaker 109 and a microphone 110 that function as part of a soft phone running on a processor 136 comprising a general purpose or personal computer. In general, the audio transceiver 108 may be any device capable of translating acoustical signals into electrical signals and vice versa.

The displays 112 and 140 may comprise any device capable of receiving a video signal and displaying a corresponding image. Accordingly, the display 112 may comprise a cathode ray tube, or a liquid crystal display.

The cameras 116*a–n* may be any device capable of translating images of a scene into electronic signals. For example, the camera 116 may comprise an optical lens system in combination with an image sensor, such as a charge coupled device or Complementary Metal Oxide Semiconductor or CMOS.

The PC 136 may is a general purpose computer. As will be appreciated, it may be any other type of computer, such as a laptop. The PC 136 may comprise a specially adapted video telecommunications processor unit, for example, utilizing a specialized controller, or a general purpose processor running code specifically adapted for performing video telecommunications functions. For example, the processor 136 may comprise a personal computer running a video telecommunications software application in conjunction with a standard operating system, such as the Windows 2000™ operating system. As a further example, the PC may be replaced with a video telephone incorporating a suitably programmed controller running firmware.

After processing or transforming the image obtained by the camera(s) 116, the video telecommunications system 100 may provide the transformed image to a video communications infrastructure 304. The video communications infrastructure 304 may comprise an encoder/decoder, one or more outputs from the video telecommunications system 100, and an external communication network interconnecting the video telecommunications system 100 to a second video telecommunications system of the second participant, or to any other video telecommunications station or device capable of displaying images for viewing by a second participant. The encoder/decoder preferably uses the MPEG-7 multimedia standard. The MPEG-7 standard allows the encoding of arbitrarily shaped video objects and provides auxiliary alpha planes to transmit additional pixel information associated to the color data. In accordance with an embodiment of the present invention, the second participant 120 may view the images provided by the video telecommunications system on a conventional video phone, or a soft video phone implemented in connection with a PC. In accordance with a further embodiment of the present invention, the video communications infrastructure 304 comprises the Internet, and utilizes Internet protocol type communications, such as the H.323 and/or Session Initiation Protocol (SIP) protocols. In addition, the video communications infrastructure 304 may comprise protocols, such as RTP, for the transfer of audio and video information between the video telecommunications system 100 used by the first participant 104 and that used by the second participant 120.

The processing of the acquired image information by the video telephony processing system 300 to extract undesired or desired image information and substitute desired substitute image information can be based on any number of known technologies. Two methods are commonly used to recognize patterns, namely template matching and feature extraction. In template matching, a reference pattern, such as that selected by the first participant in desired or undesired image information, is stored for each response. Each input image is then compared with each reference pattern until a match is found. In feature extraction, rather than matching an entire image, as in template matching, a small set of features is extracted from the acquired image information and compared to a reference set of features in the desired or undesired image information. Either approach may be implemented by one or more of a neural network, statistical shape analysis, Markov learning, source motion, and color statistics.

For example, when the desired image information is received from the first participant and is the first participant's image, the techniques described in Eisert, "*Immersive 3-D Video Conferencing: Challenges, Concepts, and Implementations*" published July 2003 (which is incorporated herein by this reference) may be employed. In this approach, the participants appear as arbitrarily shaped video objects seamlessly integrated into the substitute background of the desired substitute image information. This requires a segmentation of the moving person from the background which is assumed to remain static. Initially, the background is captured and a change detection scheme compares the reference image with the current acquired image information and provides a segmentation mask. The first participant is described in the substitute image information by planar computer graphics objects. Onto these planes, the recorded video of the first participant (or filtered image information) is projected after warping according to the estimated disparity map of the first participant. The algorithm may include permanent updating of the reference image to cope with slight changes of illumination or scene content, disparity matching to capture the depth of the captured video to permit the extraction of a 3-D representation, head-tracking based on skin color segmentation operating jointly with a facial feature tracker searching eye positions, and a shadow detection tool to effect shadow detection. Other image recognition techniques may be employed such as those described in U.S. Patent Application 2002/0113862; U.S. Pat. No. 5,164,992; and Reissue 36,041, each of which is incorporated herein by this reference and used in Version 9.0 of Imagis Technologies Inc.'s ID-2000™. As will be appreciated, where the substitute image information is small the substitute image information may alternatively be projected onto the filtered image information rather than the other way around.

The operation of the video telephony processing system 300 will now be described with reference to FIGS. 4–7.

Figure 4:
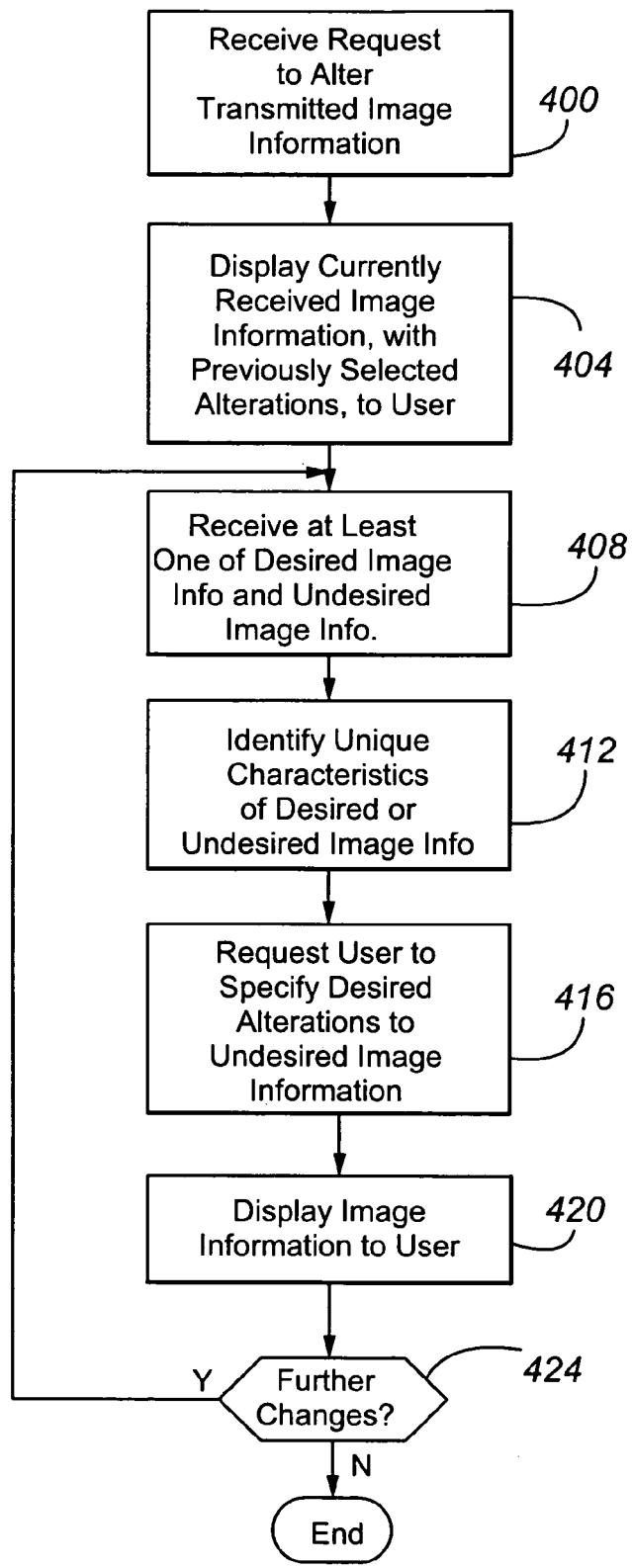
FIG. 4 is a flow chart of the operation of the video telephony processing system according to an embodiment of the present invention.

With reference to FIG. 4, the process to acquire the desired image information and/or undesired image information is depicted. In step 400, the telephony processing system 300 receives a request from the first participant to alter currently transmitted or later transmitted image information. In step 404, the image information is displayed to the first participant on the first or second monitor. The displayed image information includes any previously received alterations to the image information. For example, the first participant may have previously selected a substitute background, which is displayed in place of the actual or currently imaged background.

In step 408, the system 300 receives at least one of desired image information and undesired image information. Typically, the first participant selects one or the other but not both.

In step 412, the image alteration agent 358 identifies unique characteristics of the received desired or undesired image information. As noted above, the unique characteristic can refer to a pattern of pixels or image lines, a feature, a color or set of colors, and a shape.

In step 416, the agent 358 requests the first participant to specify the desired alterations to the undesired image information; in other words, the first participant is asked to provide or specify the desired substitute image information 382. When the substitute image information 382 is received, the composite image information 366 is formed using currently acquired image information 362 and the desired substitute image information 382.

In step 420, the composite image information is displayed to the first participant on one of the first and second monitors. In decision diamond 424, the first participant is prompted for any further changes. If there are further changes indicated by the first participant, the agent 358 returns to and repeats steps 408–420. If there are no further changes, the agent 358 terminates operation.

Figure 5:
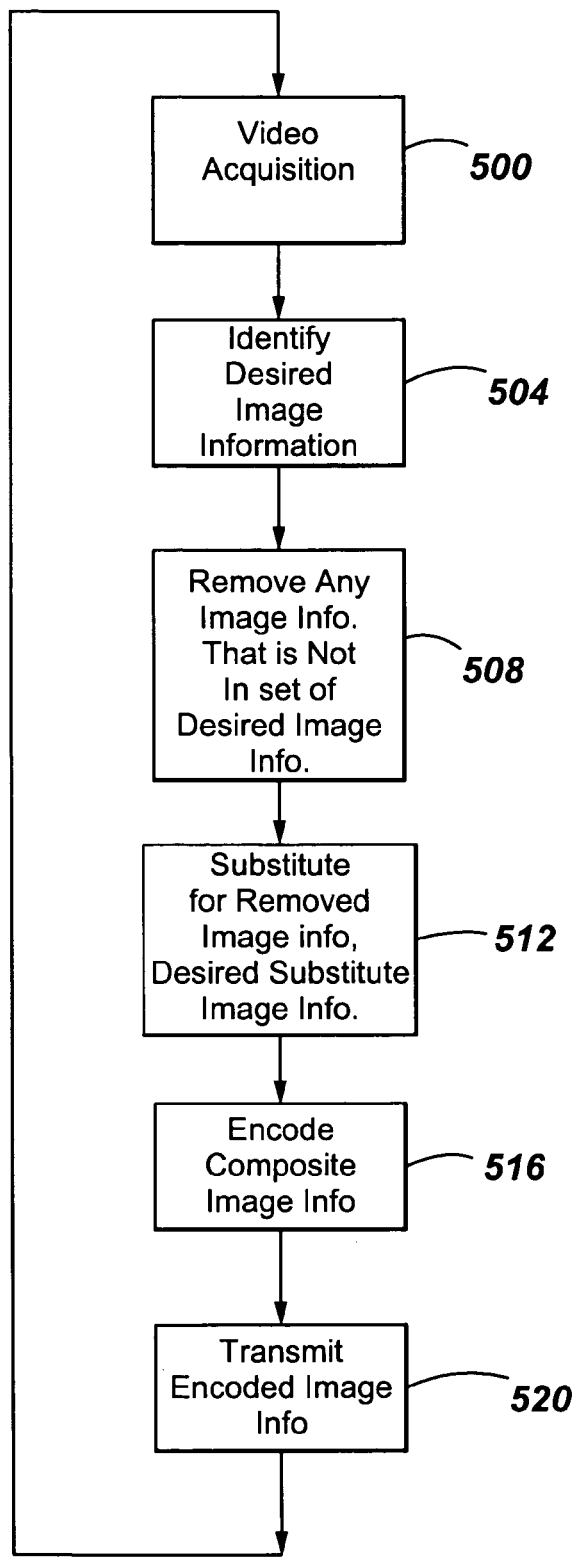
FIG. 5 is a flow chart of the operation of the video telephony processing system according to an embodiment of the present invention.

A first operational configuration of the agent 358 is shown in FIG. 5. In step 500, during a video telephony session or interaction, the acquired image information is received from the camera(s). In step 504, the desired image information 370 is identified in the acquired image information. In step 508, any image information 362 that is not in the identified desired image information 370 is removed from the acquired image information to form the filtered image information 378. In step 512, the desired substitute image information 382 is substituted for the removed image information to produce the composite image information 366. In step 516, the composite image information is encoded using a suitable algorithm, preferably MPEG 7, and transmitted to the second participant. MPEG 7 uses morphological constructs to compress video. To control the amount of processing resources consumed by the agent 358, a software timer can be used to control the number of frames per second that are fed from the camera.

Figure 6:
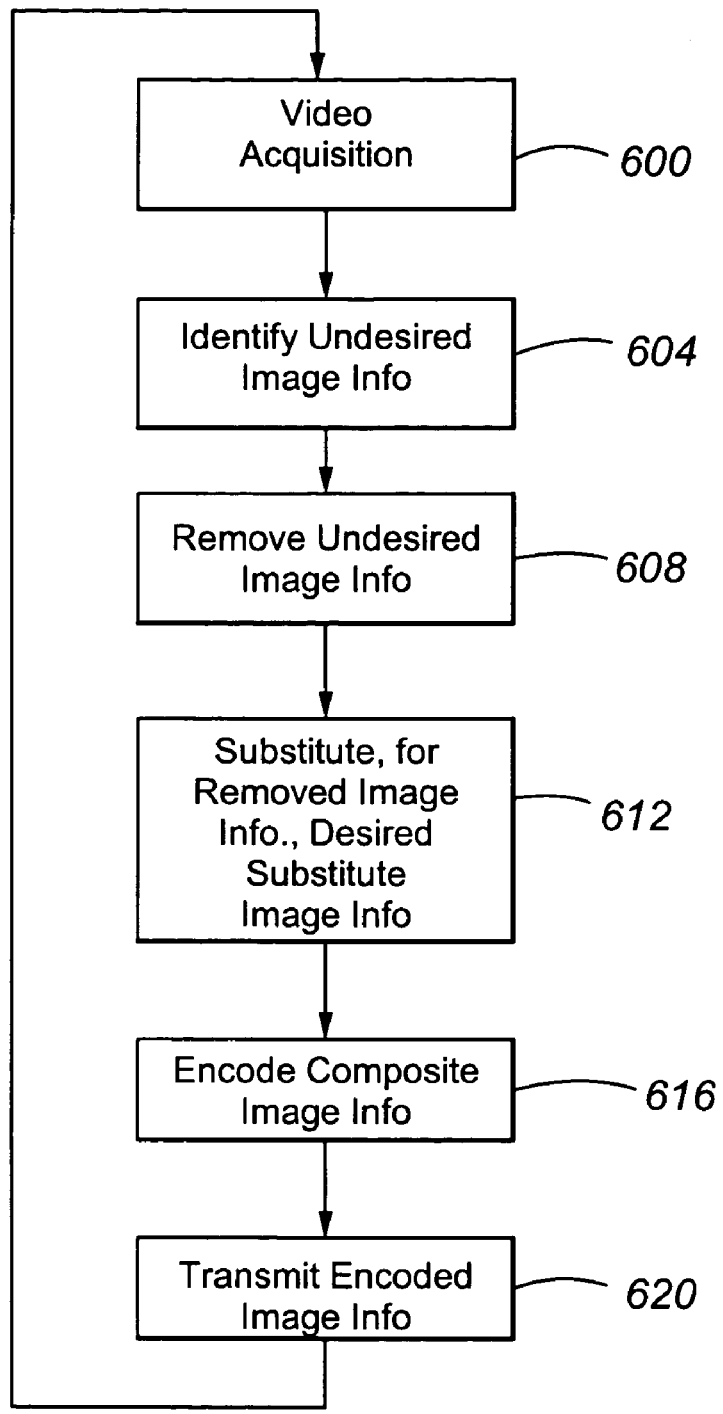
FIG. 6 is a flow chart of the operation of the video telephony processing system according to an embodiment of the present invention.

A second operational configuration of the agent 358 is shown in FIG. 6. In step 6500, during a video telephony session or interaction, the acquired image information is received from the camera(s). In step 6504, the undesired image information 374 is identified in the acquired image information. In step 608, the undesired image information 374 is removed from the acquired image information to form the filtered image information 378. In step 612, the desired substitute image information 382 is substituted for the removed undesired image information to produce the composite image information 366. In step 616, the composite image information is encoded and transmitted to the second participant.

Figure 7:
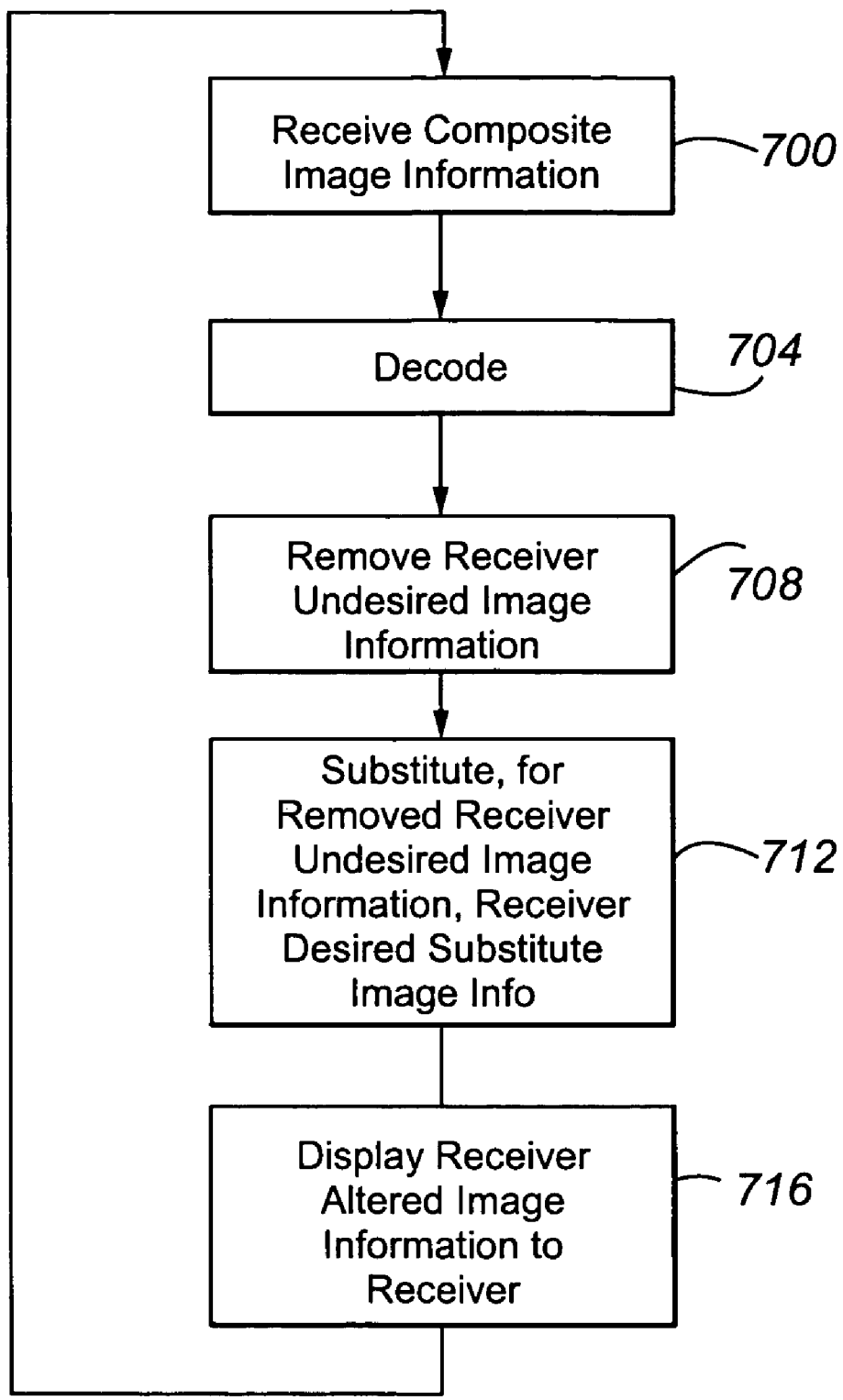
FIG. 7 is a flow chart of the operation of the video telephony processing system according to an embodiment of the present invention.

FIG. 7 depicts the operation of the agent 382 located in the video telephony processing system 300 in the video telecommunications device of the second participant.

In step 700 the composite image information 366 is received and in step 704 decoded, typically using parallel decoding devices for speed.

In step 708, the agent 358 removes any receiver undesired image information from the composite image information. As noted, the second participant may elect to further modify the received composite image information before it is displayed on his or her monitor. In step 712, the removed receiver undesired image information is replaced by receiver desired substitute image information. Steps 708 and 712 are performed using any of the techniques noted above.

In step 716, the receiver altered image information output from step 712 is displayed to the second participant during the video interaction with the first participant.

A number of variations and modifications of the invention can be used. It would be possible to provide for some features of the invention without providing others. By way of example, the video telephony processing system 300 may be used with a video conferencing system including more than two participants.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for performing a video telecommunications interaction between at least first and second participants, comprising:
   (a) acquiring image information, the image information including an image of the first participant;
   (b) removing at least one of desired and undesired image information from the acquired image information to form (i) filtered image information and (ii) the removed at least one desired and undesired image information, the removed at least one of desired and undesired image information being selected previously by the first participant; and
   (c) at least one of a sending endpoint associated with the first participant and a receiving endpoint associated with the second participant combining at least one of (i) the filtered image information and (ii) the removed desired image information with substitute image information to form composite image information, wherein the desired image information is the image of the first participant, wherein the undesired image information comprises at least part of the background in the acquired image information, wherein the substitute image information is a modified form of the background, wherein, prior to transmission to the receiving endpoint, the at least part of the background in the acquired image information is modified and/or replaced by the first participant to form the substitute image information, wherein the substitute image information is transmitted to the receiving endpoint and thereafter followed by transmission of the first participant's image only, and wherein the receiving endpoint combines the substitute image information with the received first participant's image to form the composite image information for display to the second participant.

2. The method of claim 1, wherein, in step (c), the filtered image information includes desired image information and is combined with the substitute image information.

3. The method of claim 1, wherein, in steps (b) and (c), the removed desired image information is combined with the substitute image information.

4. The method of claim 1, wherein the at least one of (i) the filtered image information and (ii) the removed desired image information in the composite image information comprises only part of a background and/or foreground of the acquired image and wherein the at least one of (i) the filtered image information and (ii) the removed desired image information is modified before formation of the composite image information.

5. The method of claim 1, wherein the sending endpoint forms the composite image information and further comprising:
   (d) transmitting the composite image information to a communication device associated with the second participant, wherein the composite image information excludes the undesired image information;
   (e) encoding the composite image information before the transmitting step (d);
   (e) the second participant's communication device receiving the composite image information;
   (f) removing at least one of second desired and undesired image information from the composite image information to form (i) second filtered image information and (ii) the removed at least one second desired and undesired image information;

(g) combining at least one of (i) the second filtered image information and (ii) the removed second desired image information with second substitute image information to form second composite image information;

(h) displaying the second composite image information to the second participant.

6. The method of claim 5, wherein, in steps (f) and (g), the undesired image information is extracted from the acquired image information and the remaining image information combined with the substitute image information.

7. A computer readable medium comprising processor-executable instructions to perform the steps of claim 1.

8. The method of claim 1, wherein the at least one of (i) the filtered image information and (ii) the removed desired image information is modified as specified by the first participant before combination with the substitute image information to form the composite image information.

9. The method of claim 1, wherein the at least one of (i) the filtered image information and (ii) the removed desired image information is modified as specified by the second participant before combination with the substitute image information to form the composite image information and wherein the at least one of (i) the filtered image information and (ii) the removed desired image information comprises the image of the first participant.

10. A video telecommunications system for effecting a communication between at least first and second participants, comprising:
(a) an imaging device operable to acquire image information, the image information including an image of the first participant;
(b) an image alteration agent operable (i) to remove at least one of desired and undesired image information from the acquired image information to form (A) filtered image information and (B) the removed at least one of desired and undesired image information, the removed at least one of desired and undesired image information being selected, prior to removal, by the first participant, and (ii) at least one of:
(b1) transmit, to a second endpoint of the second participant, at least one of (A) the filtered image information and (B) the removed desired image information for combination with substitute image information to form composite image information for presentation to the second participant; and
(b2) combine the at least one of (A) the filtered image information and (B) the removed desired image information with the substitute image information to form the composite image information, the composite information thereafter being transmitted to the second endpoint for presentation to the second participant, wherein the desired image information is the image of the first participant and the undesired image information comprises at least part of the background in the acquired image information, wherein the substitute image information is a modified form of the background, wherein, prior to transmission to the second endpoint, the at least part of the background in the acquired image information is modified and/or replaced by the first participant to form the substitute image information, wherein the substitute image information is transmitted to the second endpoint and thereafter followed by transmission of the first participant's image only, and wherein the second endpoint combines the substitute image information with the received first participant's image to form the composite image information for display to the second participant.

11. The system of claim 10, wherein the filtered image information includes desired image information and is combined with the substitute image information.

12. The system of claim 10, wherein the removed desired image information is combined with the substitute image information.

13. The system of claim 10, the at least one of (A) the filtered image information and (B) the removed desired image information in the composite image information comprises only part of a background and/or foreground of the acquired image and wherein the at least one of (A) the filtered image information and (B) the removed desired image information is modified before formation of the composite image information.

14. The system of claim 10, wherein operation (b2) is performed and further comprising:
(c) a video communication infrastructure operable to transmit the composite image information to a communication device associated with the second participant, wherein the composite image information excludes undesired image information, wherein the video communication infrastructure is further operable to encode the composite image information before the transmitting operation.

15. The system of claim 14, further comprising:
a communication device of the second participant operable (i) to receive the composite image information; (ii) remove at least one of second desired and undesired image information from the composite image information to form second filtered image information and the removed at least one second desired and undesired image information; (iii) combine at least one of (A) the second filtered image information and (B) the removed second desired image information with second substitute image information to form second composite image information; and (iv) display the second composite image information to the second participant.

16. The system of claim 15, wherein the second filtered image information includes the second desired image information and is combined with the second substitute image information.

17. The system of claim 15, wherein the second desired image information is extracted from the composite image information and combined with the second substitute image information.

18. The system of claim 15, wherein the second undesired image information is extracted from the composite image information and the remaining image information combined with the second substitute image information.

19. The system of claim 10, wherein the at least one of (A) the filtered image information and (B) the removed desired image information is modified as specified by the first participant before combination with the substitute image information to form the composite image information.

20. The system of claim 10, wherein the at least one of (A) the filtered image information and (B) the removed desired image information is modified as specified by the second participant before combination with the substitute image information to form the composite image information and wherein the at least one of (A) the filtered image information and (B) the removed desired image information comprises the image of the first participant.

21. A method for performing a video telecommunications interaction between at least first and second participants, comprising:
- (a) acquiring image information, the image information including an image of the first participant;
- (b) removing at least one of desired and undesired image information from the acquired image information, the removed at least one of desired and undesired image information having been selected previously by the first participant, wherein the desired image information is the image of the first participant, and the undesired image information comprises at least part of the background and/or foreground in the acquired image information;
- (c) prior to transmission to the receiving endpoint, at least one of modifying and replacing the at least part of the background and/or foreground in the acquired image information to form the substitute image information;
- (d) transmitting the substitute image information to the receiving endpoint; and
- (e) thereafter transmitting the first participant's image without the at least part of the background and/ore foreground to the receiving endpoint associated with the second participant for combination of the first participant's image with the substitute image information to form composite image information for display to the second participant.

22. The method of claim 21, wherein the at least part of the background and/or foreground is only part of the background and/or foreground, wherein the at least part of the background and/or foreground is modified as determined by first participant, and wherein the at least part of the background and/or foreground is selected by the first participant.

23. The method of claim 21, wherein the at least part of the background and/or foreground is all of the background and foreground but excludes the image of the first participant and wherein the at least part of the background and/or foreground is replaced by a new background and/or foreground selected by the first participant.

24. The method of claim 21, wherein the at least part of the background and/or foreground is all of the background and/or foreground and wherein the background and/or foreground is replaced by a new background and/or foreground selected by the second participant.

25. A computer readable medium comprising processor-executable instructions to perform the steps of claim 21.

* * * * *